Sept. 26, 1950     G. M. DAVEY ET AL     2,523,500
HITCH COUPLER
Filed May 15, 1948
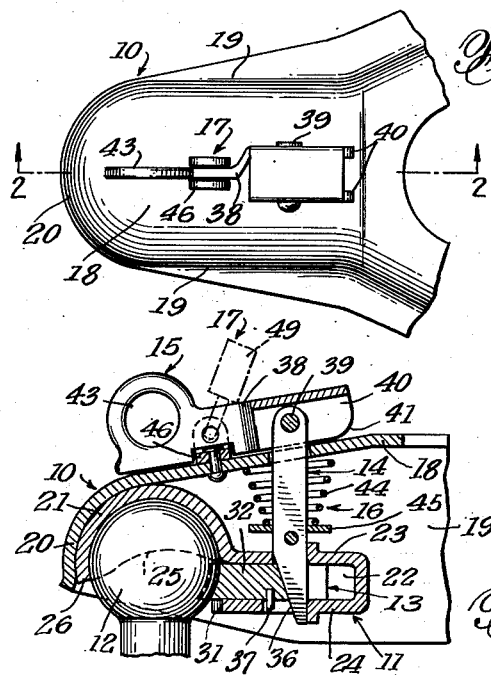
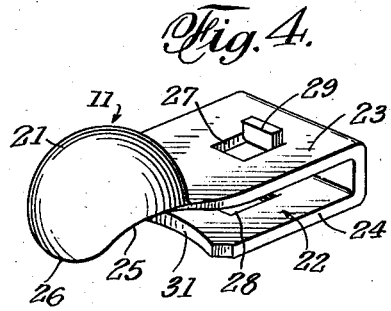
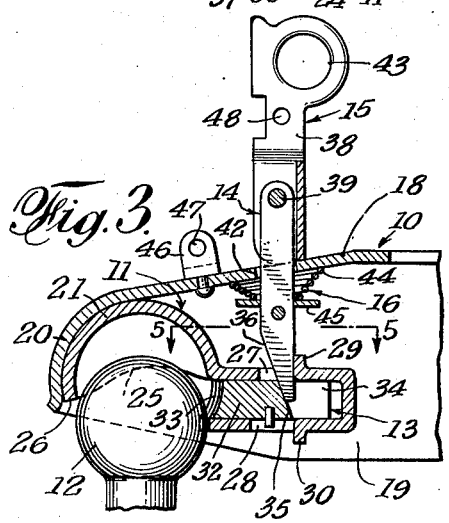
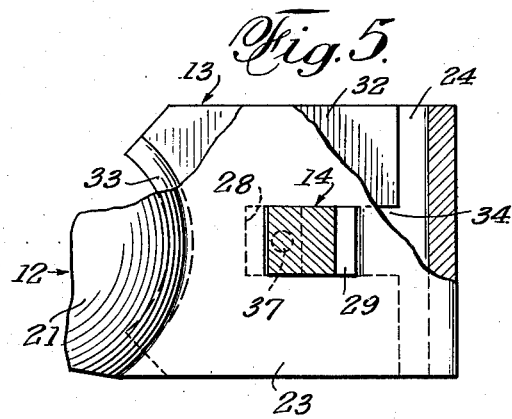
Inventors
GEORGE M. DAVEY
HAROLD HAUFLAIRE
By C. G. Stratton
Attorney Patented Sept. 26, 1950

2,523,500

UNITED STATES PATENT OFFICE 2,523,500

HITCH COUPLER

George M. Davey, Downey, and Harold Hauflaire, Glendale, Calif., assignors to Hadco Engineering Company, Huntington Park, Calif., a corporation of California Application May 15, 1948, Serial No. 27,183

1 Claim. (Cl. 280—33.17)

This invention relates to couplers for trailer hitches.

An object of the present invention is to provide a hitch coupler that is positive in operation to engage a hitch ball and is yet readily uncoupled when separation from the ball is desired.

Another object of the invention is to provide, in a hitch coupler, novel manually operable means for effecting quick and positive engagement with a hitch ball and as quick uncoupling therefrom.

Another object of the invention is to provide a hitch coupler that embodies novel spring-urged and cam-or wedge-controlled latch means for effecting the mentioned quick coupling or uncoupling of the coupler.

Our invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the invention, which is given by way of illustration or example only.

In the drawings, like reference characters designate similar parts in the several views.

Fig. 1 is a top plan view of a hitch coupler according to the present invention, the same being shown as mounted on a fragment of a plate fixedly carried by a vehicle, such as a trailer.

Fig. 2 is a vertical sectional view thereof as taken on line 2—2 of Fig. 1.

Fig. 3 is a similar view showing the coupler with the latch means retracted as when coupling or uncoupling the same.

Fig. 4 is a perspective view of a coupler element employed in the present device.

Fig. 5 is an enlarged broken plan sectional view as taken on line 5—5 of Fig. 3.

The hitch coupler that is illustrated comprises, generally, the mentioned plate 10; the coupler element 11 rigidly fixed to the bottom of said plate and receptive of a hitch ball 12, the latter being mounted on a towing vehicle for the trailer or vehicle mounting the present hitch coupler; a latch 13 slidably mounted in coupler element 11, a latch bar 14 operatively engaged with the latch for urging the same in a direction to operatively engage the hitch ball, handle means 15 connected to the latch bar and manually movable to move the latter between projected and retracted positions; spring means 16 for projecting the latch bar as controlled by the manual position of the handle means 15; and means 17 for locking the handle means 15 in the position the same assumes when the latch bar is projected to move the latch into ball-engaging position.

That fragment of plate 10 which is illustrated, is formed with a top wall 18 that is rounded over at the sides and at the front to form integral side walls 19 and a partially spherical seat or cavity 20 formed at the junction of said side walls. The under side of said plate is, thereby, hollow and houses the coupler element 11, the latch 13, the lower portion of latch bar 14, and the spring means 16.

The coupler element 11 is formed with a socket part 21 that is designed to fit into seat or cavity 20 and to be affixed thereto as by suitable welds. Said element, from the socket part rearward, is formed with a slide-way 22 defined between upper and lower walls 23 and 24, respectively.

The socket part 21 is so proportioned as to receive the hitch ball which is adapted to enter from beneath. Consequently, the sides 25 of said socket part terminate above the center. However, the front end of said part is extended below the center to provide a lip 26 that serves as one retaining point for the ball. In the present arrangement, the latch 13 that engages ball 12 opposite to said lip, comprises the other ball retaining point.

The slideway 22 houses latch 13 and guides the same for movement toward and from the hitch ball. The walls 23 and 24 are formed with upper and lower aligned openings 27 and 28, respectively for movement therethrough of latch bar 14. In order to guide the latter, portions of walls 23 and 24 are respectively upwardly and downwardly bent to form guide abutments 29 and 30, the same bearing on said latch bar to maintain a substantially vertical disposition thereof in all positions. Said abutments, as will become apparent, receive rearward thrust of hitch ball 12 in use. The forward edge 31 of wall 24 is convexly curved to clear the hitch ball during its movement into and out of socket 21.

The latch 13 comprises a plate 32 that slidably fits between walls 23 and 24. The forward edge 33 of said plate is doubly curved to be spherical and thereby form a continuation of the spherical curvature of socket 21. Said edge is designed and positioned to engage the hitch ball below the center and cooperate with lip 26 to retain said ball in operative position. The opposite end of plate 32 is formed with a notch 34 and the transverse inner wall 35 of said notch is sloped or angled from the top rearwardly for cam wedging engagement with the latch bar.

The latch bar 14 is formed of preferably square stock and at its lower end is formed with a sloping face 36 that cooperates with wall 35 of the latch. It will be evident that upon projection of latch bar 14 downwardly, the latch 13 will be urged thereby into hitch ball-engaging position. Retraction of the latch bar will free the latch so that the same will slide rearwardly when the hitch ball is extracted from the socket. To obviate complete disassociation of the latch from the slideway, the former is provided with a pin 37 that is arranged to limit outward movement of said ledge by abutting against an edge of opening 28.

The handle means 15 is designed to effect the mentioned projection and retraction of the latch bar. The same comprises an elongated handle 38 which, at an intermediate point is connected by a pivot pin 39 to the latch bar. The rearward end of handle 38 is formed to have a channel cross section to provide spaced walls 40, the ends of which are rounded at 41, remote from pin 39, for cam engagement with plate wall 18 on each side of an opening 42 provided in said wall for the latch bar. In the normal position of Fig. 2 the handle extends along plate wall 18 and said rounded ends 41 are disposed rearward of the pivot. In this position, the latch bar is projected as shown. Upon grasping a finger loop 43 provided on the forward end of the handle and swinging the same upwardly, the rounded ends 41 are brought to bear on plate wall 18 and as the swinging movement progresses, said rounded ends cam along said wall and cause a gradual raising of pin 39. When the position of Fig. 3 is achieved, the latch bar 14 will be retracted to free the latch 13 as hereinbefore indicated.

The spring means 16 cooperates in the above action, said means comprising a compression spring 44 around the latch bar and confined between the under face of plate wall 18 and a washer or the like 45 on said latch bar. Thus, said spring means at all times acts in a direction to project the latch bar and is overcome by the leverage force applied through the handle. Said handle not only pivots but also slides during movement between the two positions thereof that are illustrated.

The locking means 17 comprises a clip 46 having aligned apertures 47 and mounted on plate wall 18 and an opening 48 in the handle. In the position of Fig. 2 which is the operative position, said apertures 47 and opening 48 are aligned to receive the hasp of a padlock 49. Unless the padlock is removed, the herein-described hitch coupler will retain operative connection with the hitch ball.

While we have illustrated and described what we now regard as the preferred embodiment of our invention, the construction is, of course, subject to modifications without departing from the spirit and scope of our invention. We, therefore, do not wish to restrict ourselves to the particular form of construction illustrated and described, but desire to avail ourselves of all modifications that may fall within the scope of the appended claim.

Having thus described our invention, what we claim and desire to secure by Letters Patent is:

A hitch coupler comprising a hollow housing formed with a downwardly facing spherical cavity at the front end thereof, a coupler element having a socket for a hitch ball, said socket fitting into said cavity and being fixedly connected therein, an integral rearward extension on said coupler element and comprising upper and lower walls constituting a slideway, each wall and said housing, rearward of the cavity, having an opening therethrough and said openings being vertically aligned, a latch bar extending through said three openings and thereby guided for vertical movement, said latch bar having a sloping face on the side thereof directed toward the socket of the coupler element, a latch in said slideway and having a sloping face operatively engaged with the sloping face of the latch bar and having a spherically curved forward end face that forms a continuation of the mentioned socket, an abutment on the latch bar between its sloping face and the end thereof that extends through the opening in the housing, a compression spring between said abutment and said housing and normally projecting the latch bolt to urge the spherical face of the latch into firm engagement with a hitch ball residing in said socket, and a manually swingable handle pivotally connected at an intermediate point thereof to the mentioned extending end of the latch bar, said handle thereby having a lateral rearward extension engageable with the housing and having sliding contact therewith to constitute a sliding fulcrum, when the handle is swung, to elevate the latch bar, compress said spring, and withdraw the sloping face of said latch bar from engagement with the sloping face of the latch.

GEORGE M. DAVEY.
HAROLD HAUFLAIRE.

REFERENCES CITED

The following references are of record in the file of this patent:

UNITED STATES PATENTS

| Number | Name | Date |
|---|---|---|
| 2,170,980 | Thorp et al. | Aug. 29, 1939 |
| 2,204,882 | Berluti | June 18, 1940 |
| 2,237,031 | Gilmore | Apr. 1, 1941 |
| 2,377,368 | Polstra | June 5, 1945 |

Certificate of Correction

September 26, 1950

Patent No. 2,523,500

GEORGE M. DAVEY ET AL.

It is hereby certified that error appears in the above numbered patent requiring correction as follows:

In the grant, line 3, address of assignee, for "Hunting Park, California" read *Huntington Park, California*;

and that the said Letters Patent should be read as corrected above, so that the same may conform to the record of the case in the Patent Office.

Signed and sealed this 5th day of December, A. D. 1950.

[SEAL]

THOMAS F. MURPHY,
*Assistant Commissioner of Patents.*